US012764274B1

(12) United States Patent
Jagannathan

(10) Patent No.: US 12,764,274 B1
(45) Date of Patent: Oct. 13, 2026

(54) SYSTEMS AND METHODS TO ADAPTIVELY SELECT LONG TERM REFERENCE FRAMES FOR STREAMING VIDEO

(71) Applicant: Amazon Technologies, Inc., Seattle, WA (US)

(72) Inventor: Srikkanth Jagannathan, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 3 days.

(21) Appl. No.: 18/958,541

(22) Filed: Nov. 25, 2024

(51) Int. Cl.

| | |
|---|---|
| ***H04N 19/105*** | (2014.01) |
| ***H04N 19/156*** | (2014.01) |
| ***H04N 19/164*** | (2014.01) |
| ***H04N 19/172*** | (2014.01) |
| ***H04N 19/58*** | (2014.01) |

(52) U.S. Cl.
CPC ......... *H04N 19/105* (2014.11); *H04N 19/156* (2014.11); *H04N 19/164* (2014.11); *H04N 19/172* (2014.11); *H04N 19/58* (2014.11)

(58) Field of Classification Search
CPC .. H04N 19/105; H04N 19/156; H04N 19/164; H04N 19/172; H04N 19/58
See application file for complete search history.

(56) References Cited

U.S. PATENT DOCUMENTS

| | | | | |
|---|---|---|---|---|
| 2019/0289286 | A1* | 9/2019 | Kitamura | H04N 19/426 |
| 2019/0297345 | A1* | 9/2019 | Jou | H04N 19/159 |
| 2022/0210469 | A1* | 6/2022 | Zhou | H04N 19/172 |
| 2025/0142088 | A1* | 5/2025 | Zhang | H04N 19/187 |
| 2026/0006242 | A1* | 1/2026 | Zhang | H04N 19/58 |

OTHER PUBLICATIONS

Qualcomm, "Error Resilience—Long Term Reference Frames," www.qualcomm.com, Qualcomm Technologies, Inc., Jun. 13, 2023, accessed Sep. 12, 2024, URL: https://docs.qualcomm.com/bundle/publicresource/topics/80-56386-10/er_long_term_reference_frames.html, 7 pages.

* cited by examiner

*Primary Examiner* — James M Pontius
(74) *Attorney, Agent, or Firm* — Athorus, PLLC

(57) ABSTRACT

Systems and methods to adaptively select long term reference (LTR) frames in order to maintain video quality for streaming video services may comprise an encoder of a video server, a decoder of a client device, and a network. The encoder may determine a frequency for marking frames as LTR frames based on various factors, and may select, encode, and transmit LTR frames based on the determined frequency. In addition, the encoder may determine a content or quality metric of encoded frames, and may select, encode, and transmit LTR frames based on the content or quality metric.

17 Claims, 8 Drawing Sheets

SYSTEMS AND METHODS TO ADAPTIVELY SELECT LONG TERM REFERENCE FRAMES FOR STREAMING VIDEO

BACKGROUND

Streaming video systems and methods may generally utilize long term reference frames to encode frames of streaming video to maintain video quality. However, conventional systems and methods may select or mark a frame as a long term reference frame only after an acknowledgement of a previously marked long term reference frame has been received. As a result, the gap or time between acknowledged long term reference frames may be large or long, thereby resulting in degraded video quality. Accordingly, there is a need for systems and methods to adaptively select long term reference frames in order to maintain video quality for streaming video.

DETAILED DESCRIPTION

Figure 1A:
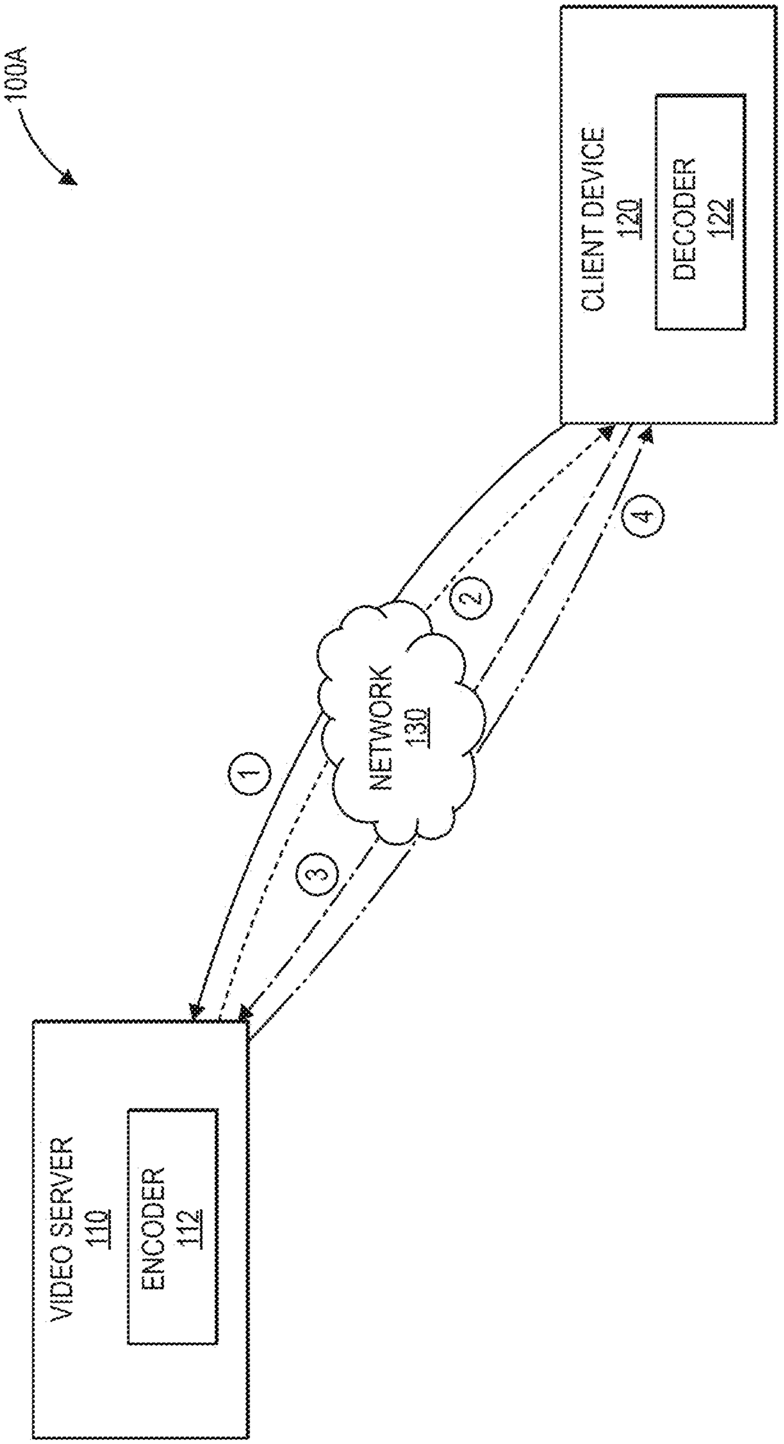
FIG. 1A is a schematic diagram of an example video streaming session using adaptively selected long term reference frames, in accordance with implementations of the present disclosure.

As is set forth in greater detail below, implementations of the present disclosure are directed to systems and methods to adaptively select long term reference frames in order to maintain video quality for streaming video.

Generally, for streaming video data, a long term reference (LTR) frame may comprise an image frame of video data that can be used to encode further image frames, e.g., by using the LTR frame as a reference for encoding of one or more further image frames. In some examples, an LTR frame may be used to encode image frames that are more than two frames away or removed from the LTR frame. In contrast to an LTR frame, although a short term reference (STR) frame may also comprise an image frame of video data that can be used to encode further image frames, e.g., by using the STR frame as a reference for encoding of one or more further image frames, an STR frame may generally be used to encode image frames that are only up to two frames away or removed from the STR frame. Further, an LTR frame may also comprise an I-frame, e.g., an image frame that can be used individually to encode all video data of a single frame, or a P-frame, e.g., an image frame that generally does not encode all video data of a single frame and uses at least one other image frame as a reference. As a result, an LTR frame may individually encode all video data of a single image frame, or an LTR frame may not encode all video data of a single image frame and may use at least one other image frame as a reference.

In conventional systems related to streaming video, an encoder of a video server may mark an image frame as a long term reference (LTR) frame, and transmit the LTR frame to a decoder of a client device via a network. The decoder may receive and decode the LTR frame for presentation via the client device, and upon successful receipt and decoding of the LTR frame, the decoder may transmit an acknowledgement message or signal to the encoder of the video server via the network. Upon receiving the acknowledgement message or signal, the encoder may use the LTR frame as a reference when encoding future frames to be transmitted to the decoder. Generally only after receiving the acknowledgement message or signal will the encoder mark another image frame as an LTR frame, and then transmit the new LTR frame to the decoder of the client device via the network. As a result, in conventional systems, LTR frames may generally be marked and transmitted only upon successful acknowledgement of previously transmitted LTR frames. However, if transmission latency between the encoder and decoder is high or increases, the number of frames between an LTR frame and an encoded frame that uses the LTR frame as a reference may increase, thereby reducing video quality.

In example embodiments described herein, instead of waiting to receive acknowledgement messages or signals for previously transmitted LTR frames, an encoder of a video server may mark one or more additional image frames as LTR frames, and transmit the additional LTR frames to a decoder of a client device via a network. For example, while a first LTR frame is being transmitted to and decoded by a decoder of a client device, a second LTR frame may be marked by the encoder for transmission to the decoder, even before or in the absence of receiving an acknowledgement message or signal from the decoder related to the first LTR frame. By adaptively marking and transmitting LTR frames in this manner, the number of frames between an LTR frame and an encoded frame that uses the LTR frame as a reference may be reduced as compared to conventional systems, thereby maintaining or improving video quality.

In additional example embodiments, the selection or marking of individual image frames as LTR frames may be performed adaptively based on various factors. For example, the various factors may include a framerate of the video data to be encoded and transmitted, a number of available LTR slots of the encoder, a number of available LTR slots of the decoder, a transmission latency or round-trip time associated with image frame transmission and acknowledgement receipt, and/or various other factors. In further example embodiments, the various factors may also include one or more metrics related to image frame content, image frame quality, or differences in content between image frames. For example, if a difference in content between a reference frame and an encoded frame is higher than a threshold value, a next image frame to be encoded may be adaptively marked as an LTR frame. As further described herein, an example metric related to differences in content between image frames may include a quantization parameter that comprises a rough or approximate measure of quality of an encoded frame relative to at least one reference frame.

In further example embodiments, the systems and methods to adaptively select long term reference frames in order to maintain video quality for streaming video as described herein may be applied to various types of video data and video streams, including streaming television, movies, or other media, streaming, online, or cloud video games or gaming services, other live-streaming media or games, and/or other types of streaming video data. In addition, the systems and methods to adaptively select long term reference frames in order to maintain video quality for streaming video as described herein may be applied to various video compression standards or techniques, such as Advanced Video Coding (AVC/H.264) standards, High Efficiency Video Coding (HEVC/H.265) standards, AOMedia Video 1 (AV1) standards, various MPEG (Moving Pictures Experts Group) standards, or other video compression standards, techniques, or technologies.

FIG. 1A is a schematic diagram 100A of an example video streaming session using adaptively selected long term reference frames, in accordance with implementations of the present disclosure.

As shown in the simplified diagram of FIG. 1A, an example video streaming session may be initiated between a video server 110 and a client device 120 via a network 130. The video server 110 may comprise one or more processors, memories, encoders 112, communication devices, and/or other components configured to store, convert, compress, encode, process, transmit, and/or receive various data related to streaming video services. In addition, the client device 120 may comprise one or more processors, memories, decoders 122, communication devices, and/or other components configured to store, convert, compress, decode, process, receive, and/or transmit various data related to streaming video services.

In the example of FIG. 1A, the decoder 122 of the client device 120 may send or transmit a request, illustrated by solid line arrow 1, to the encoder 112 of the video server 110 to initiate a video streaming session via the network 130. For example, the request may comprise an identifier of the client device 120, identification of a particular video stream or content to be provided, payment or account information associated with the client device 120, specifications or configurations of the client device 120, and/or various other data related to the request. In some examples, the specifications may comprise data related to historical or current network latency between the client device 120 and the video server 110, a number of available long term reference slots associated with the decoder 122, and/or other data related to hardware or software configurations of the client device 120.

The encoder 112 of the video server 110 may receive and process the request. For example, the processing by the encoder 112 may comprise identifying the client device 120, determining whether the client device 120 includes appropriate authorizations or access credentials, determining whether the encoder 112 can accept and fulfill the request, and/or various other setup, handshake, or other authorization steps. If the video server 110 and encoder 112 determine that the request is approved, the encoder 112 may send or transmit an authorization, illustrated by dashed line arrow 2, to the decoder 122 of the client device 120 for the requested video streaming session. In some examples, as part of the authorization, the encoder 112 may transmit a ping or signal to the decoder 122 to detect or measure a network latency therebetween, as further described herein.

In some example embodiments, upon receiving the authorization, the decoder 122 of the client device 120 may then send various additional information, illustrated by dash-dotted line arrow 3, to the encoder 112 of the video server 110 to begin the video streaming session. For example, in some examples, the specifications related to historical or current network latency between the client device 120 and the video server 110, a number of available long term reference slots associated with the decoder 122, and/or other data related to hardware or software configurations of the client device 120 may be sent after receiving the authorization from the video server 110. In addition, the initial request may be related to setting up a communication connection between the client device 120 and the video server 110, and after receiving confirmation or authorization of the connection, the client device 120 may then send various additional data or specifications, as well as a request to begin transmission of the video stream from the encoder 112 to the decoder 122. Further, the decoder 122 may transmit a return ping or signal back to the encoder 112 in order to facilitate determination of the network latency therebetween.

Based on the data, specifications, and requests received from the decoder 122, the encoder 112 may process such data to adaptively determine a frequency for marking frames of the video stream as long term reference (LTR) frames, as further described in more detail herein. In example embodiments, the frames may be selected for marking as LTR frames based on various factors, including the network latency between the encoder 112 and the decoder 122, a number of available LTR slots of the encoder 112 and/or the decoder 122, a framerate of the video stream to be transmitted, a quality or content of encoded frames of the video stream, and/or various other factors. Then, the encoder 112 may transmit the video stream, as illustrated at dash-double dotted line arrow 4, to the decoder 122, in which the video stream may include frames that have been selected or marked as LTR frames based on the frequency. As the video stream is provided or transmitted to the decoder 122, additional frames may be selected or marked as LTR frames based on the frequency. Further, the frequency may change periodically or intermittently over time responsive to changes to one or more factors that may be used to determine the frequency.

In various other example embodiments, more or fewer requests, acknowledgments, authorizations, or other communications, illustrated by the numbered arrows in FIG. 1A, may occur between the encoder 112 of the video server 110 and the decoder 122 of the client device 120. For example, various aspects described herein may be combined or aggregated into single or fewer communications. Alternatively, some portions of the communications may be further separated or isolated with respect to each other as additional communications. Moreover, various additional communications may occur between the encoder 112 and decoder 122, e.g., reestablishing or modifying communication connections, temporarily pausing or suspending video streaming sessions, terminating or completing video streaming sessions, and/or others.

Figure 1B:
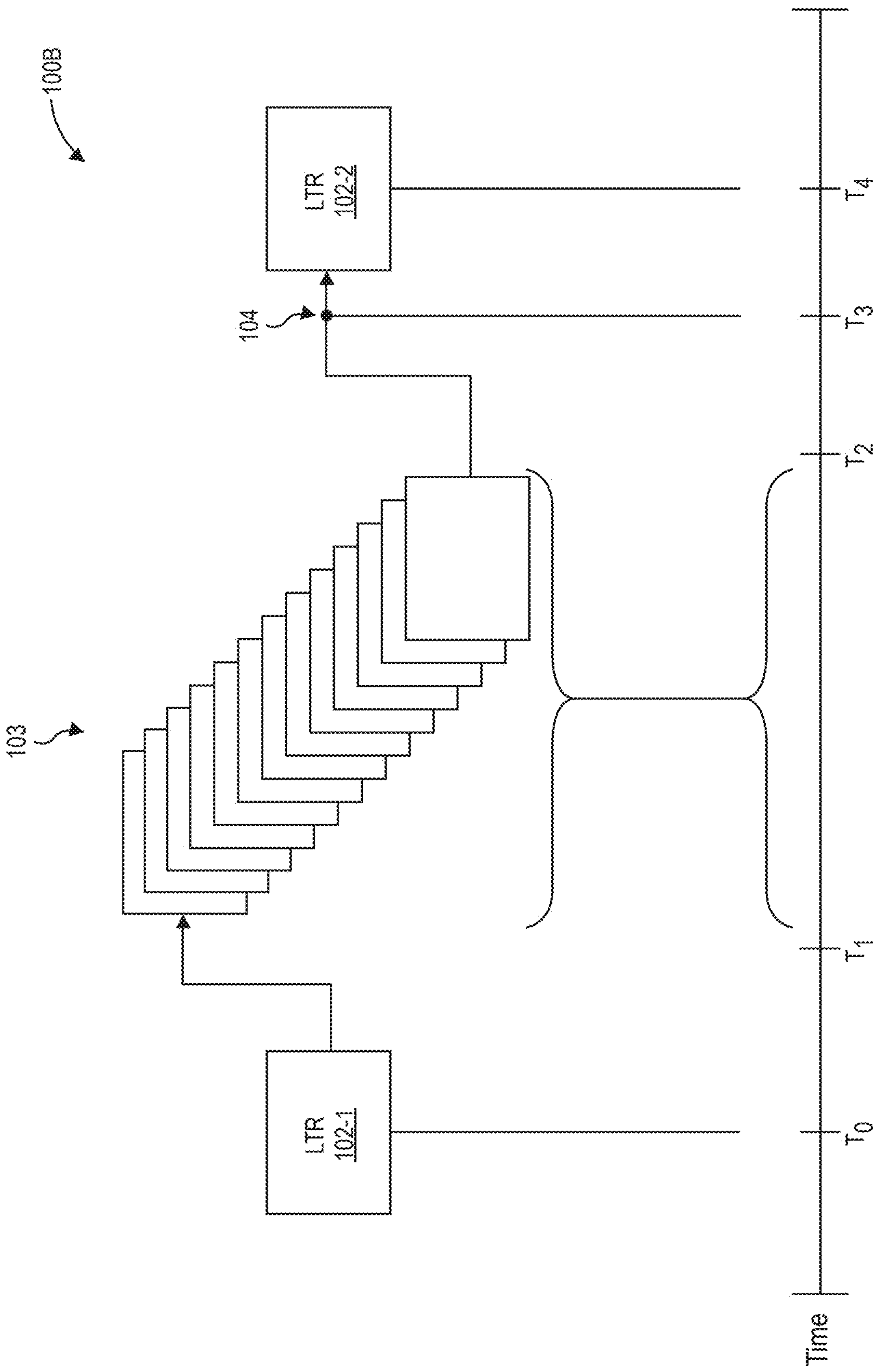
FIG. 1B is a schematic diagram of a conventional long term reference frame selection sequence.

FIG. 1B is a schematic diagram 100B of a conventional long term reference frame selection sequence.

As shown in the schematic timeline diagram of FIG. 1B for a conventional long term reference frame selection sequence, at time $T_0$, an encoder of a video server may select or mark an image frame of video data as a first LTR frame 102-1, and may also encode and transmit the first LTR frame 102-1 to a decoder of a client device via a network. Between times $T_1$ and $T_2$, the encoder may encode and transmit further image frames 103, e.g., one or more further image frames of video data after the first LTR frame 102-1.

At time $T_3$, the encoder may receive, from the decoder of the client device via the network, an acknowledgement message or signal 104 that indicates successful receipt and decoding of the first LTR frame 102-1. Upon receiving the acknowledgement signal 104, the encoder may utilize the acknowledged first LTR frame 102-1 as a reference for encoding further image frames after time $T_3$. Then, at time $T_4$ after time $T_3$, the encoder of the video server may select or mark an image frame of video data as a second LTR frame 102-2, and may also encode and transmit the second LTR frame 102-2, e.g., using the first LTR frame 102-1 as a reference, to the decoder of the client device via the network.

The sequence shown in FIG. 1B may substantially repeat over time. For example, after time $T_4$, the encoder may continue to encode and transmit further image frames, e.g., using the first LTR frame 102-1 as a reference. At a later time after transmitting such further image frames, the encoder may receive, from the decoder of the client device via the network, an acknowledgement message or signal that indicates successful receipt and decoding of the second LTR frame 102-2. Upon receiving the acknowledgement signal, the encoder may utilize the acknowledged second LTR frame 102-2 as a reference for encoding further image frames. Furthermore, after receiving the acknowledgement signal associated with the second LTR frame 102-2, the encoder of the video server may select or mark an image frame of video data as a third or further LTR frame, and may also encode and transmit the third or further LTR frame to the decoder of the client device via the network.

Because the selection or marking of an image frame as a next LTR frame occurs only after receiving an acknowledgement message or signal associated with a prior LTR frame, the conventional LTR frame selection sequence may result in large number of frames that are encoded using a previously acknowledged LTR frame, thereby reducing video quality. Moreover, if the transmission latency or round-trip time associated with image frame transmission and acknowledgement receipt increases, the number of frames between a previously acknowledged LTR frame and an encoded frame that uses the LTR frame as a reference may correspondingly increase, thereby further reducing video quality.

Furthermore, if an image frame that is marked as an LTR frame is lost or corrupted during encoding, transmission, and/or decoding, and/or an acknowledgement message or signal associated with the LTR frame is lost or corrupted during transmission, the number of frames between a previously acknowledged LTR frame and an encoded frame that uses the LTR frame as a reference may increase even further. In such cases, the encoder may select and mark a next LTR frame, e.g., after some delay following an expected receipt of the acknowledgement signal, but in the interim, the number of frames between a previously acknowledged LTR frame and an encoded frame that uses the LTR frame as a reference may continue to increase, thereby reducing video quality.

Thus, the conventional long term reference frame selection sequence shown in the schematic timeline diagram of FIG. 1B suffers from reduced or degraded video quality, at least in part due to the extended and uncertain delay or duration between selection or marking of image frames of the video data as LTR frames.

Figure 2:
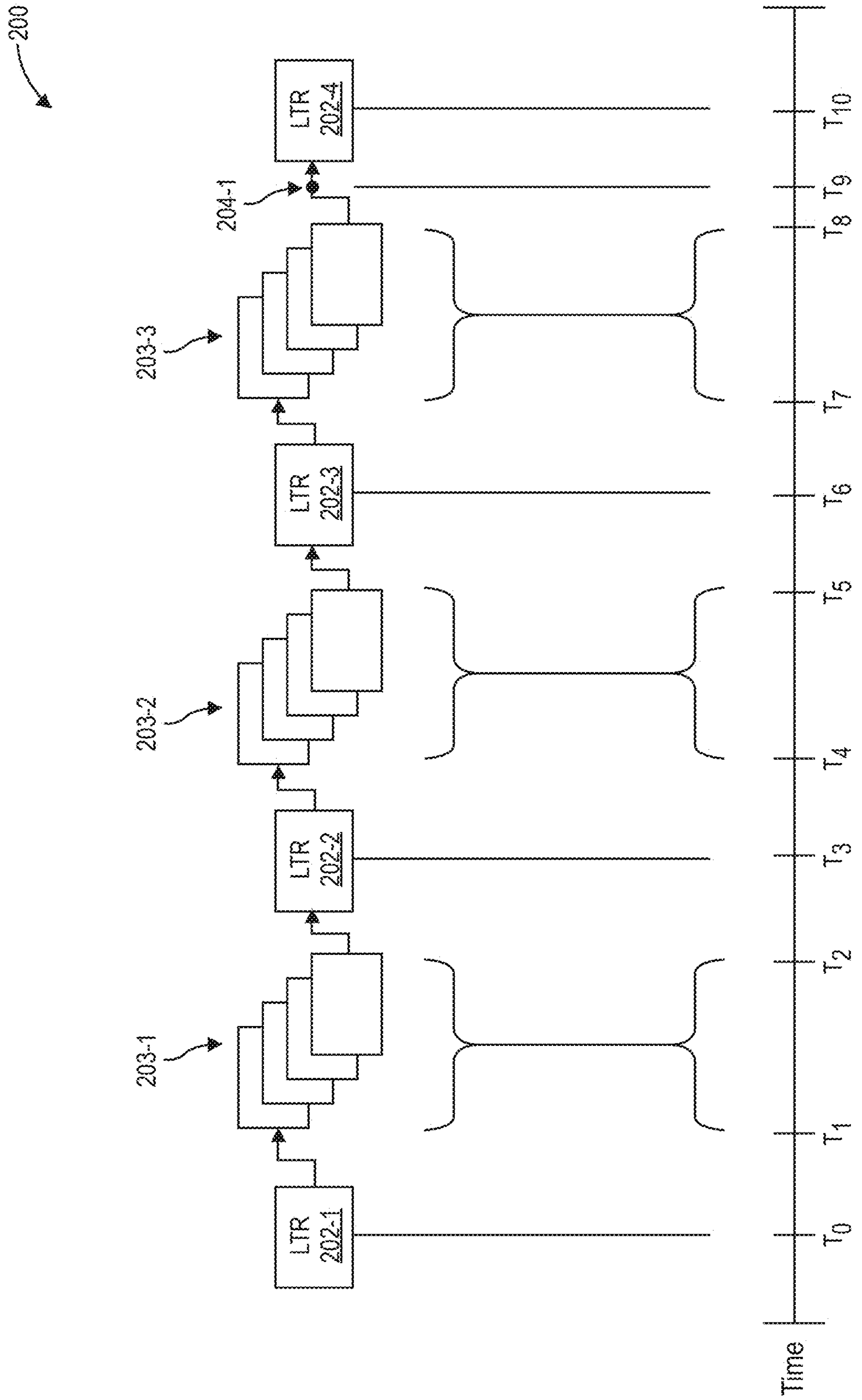
FIG. 2 is a schematic diagram of an example long term reference frame selection sequence, in accordance with implementations of the present disclosure.

FIG. 2 is a schematic diagram 200 of an example long term reference frame selection sequence, in accordance with implementations of the present disclosure.

As shown in the schematic timeline diagram of FIG. 2 for an example embodiment of a long term reference frame selection sequence, at time $T_0$, an encoder of a video server may select or mark an image frame of video data as a first LTR frame 202-1, and may also encode and transmit the first LTR frame 202-1 to a decoder of a client device via a network. Between times $T_1$ and $T_2$, the encoder may encode and transmit further image frames 203-1, e.g., one or more further image frames of video data after the first LTR frame 202-1.

Then, without waiting for and/or irrespective of receipt of an acknowledgement message or signal associated with the first LTR frame 202-1, at time $T_3$, the encoder of the video server may select or mark a next image frame of video data as a second LTR frame 202-2, and may also encode and transmit the second LTR frame 202-2 to the decoder of the client device via the network. Between times $T_4$ and $T_5$, the encoder may encode and transmit further image frames 203-2, e.g., one or more further image frames of video data after the second LTR frame 202-2.

Further, still without waiting for and/or irrespective of receipt of an acknowledgement message or signal associated with either the first LTR frame 202-1 or the second LTR frame 202-2, at time $T_6$, the encoder of the video server may select or mark a next image frame of video data as a third LTR frame 202-3, and may also encode and transmit the third LTR frame 202-3 to the decoder of the client device via the network. Between times $T_7$ and $T_8$, the encoder may encode and transmit further image frames 203-3, e.g., one or more further image frames of video data after the third LTR frame 202-3.

In the illustrated example, at time $T_0$, the encoder may receive, from the decoder of the client device via the network, an acknowledgement message or signal 204-1 that indicates successful receipt and decoding of the first LTR frame 202-1. Upon receiving the acknowledgement signal 204-1, the encoder may utilize the acknowledged first LTR frame 202-1 as a reference for encoding further image frames after time $T_9$. Then, at time $T_{10}$ after time $T_9$, the encoder of the video server may select or mark a next image frame of video data as a fourth LTR frame 202-4, and may also encode and transmit the fourth LTR frame 202-4, e.g., using the first LTR frame 202-1 as a reference, to the decoder of the client device via the network.

The example sequence shown in FIG. 2 may substantially repeat over time, e.g., with receipt over time of additional acknowledgement signals associated with other previously transmitted LTR frames, e.g., LTR frames 202-2, 202-3, 202-4, etc., as well as encoding and transmission over time of future selected LTR frames and additional image frames. For example, after time $T_{10}$, the encoder may continue to encode and transmit further image frames, e.g., using the first LTR frame 202-1 as a reference. At a later time after transmitting such further image frames, the encoder may receive, from the decoder of the client device via the network, an acknowledgement message or signal that indicates successful receipt and decoding of the second LTR frame 202-2. Upon receiving the acknowledgement signal, the encoder may utilize the acknowledged second LTR frame 202-2 as a reference for encoding further image frames.

In one example embodiment, the selection or marking of successive image frames as LTR frames may occur according to or based on a fixed interval, e.g., after encoding and transmitting a fixed or determined number of frames such as every $4^{th}$ frame, every $5^{th}$ frame, every $6^{th}$ frame, or other fixed intervals. In additional example embodiments, the selection and marking of successive image frames as LTR frames may occur adaptively based on various factors that are used to determine or calculate a frequency for marking frames as LTR frames, or an average gap or number of frames between frames that are to be marked as successive LTR frames. For example, the various factors may include a framerate of the video data to be encoded and transmitted, a number of available LTR slots of the encoder, a number of available LTR slots of the decoder, a transmission latency or round-trip time associated with image frame transmission and acknowledgement receipt, and/or various other factors. According to the various example embodiments, the selection or marking of successive image frames as LTR frames may not be dependent upon or triggered by receipt of an acknowledgement signal associated with one or more previously transmitted LTR frames.

By selecting LTR frames using a fixed interval or adaptively based on various factors, the example LTR frame selection sequence described herein may result in a relatively smaller number of frames that are encoded using a previously acknowledged LTR frame, thereby maintaining or improving video quality. Moreover, if the transmission latency or round-trip time associated with image frame transmission and acknowledgement receipt increases or changes, the number of frames between a previously acknowledged LTR frame and an encoded frame that uses the LTR frame as a reference may remain fixed or may be adaptively changed or reduced, thereby further maintaining or improving video quality.

Furthermore, if an image frame that is marked as an LTR frame is lost or corrupted during encoding, transmission, and/or decoding, and/or an acknowledgement message or signal associated with the LTR frame is lost or corrupted during transmission, the number of frames between a previously acknowledged LTR frame and an encoded frame that uses the LTR frame as a reference may be maintained at a relatively smaller number using the example LTR frame selection sequence described herein, due to the fixed interval or the adaptive selection, encoding, and transmission of additional LTR frames over time.

Thus, the example long term reference frame selection sequence shown in the schematic timeline diagram of FIG. 2 may maintain or improve video quality, at least in part due to the adaptive selection, encoding, and transmission of LTR frames over time, that may be performed in the absence of and/or irrespective of receipt of an acknowledgement message or signal associated with previously transmitted LTR frames.

In some example embodiments, the selection and marking of successive image frames as LTR frames may be adaptively based on a framerate of the video data to be encoded and transmitted, a number of available LTR slots of the encoder, a number of available LTR slots of the decoder, and a transmission latency or round-trip time associated with image frame transmission and acknowledgement receipt.

In various examples, the framerate of the video data may be approximately 60 fps (frames per second), approximately 120 fps, or other values. In addition, the number of available LTR slots of an encoder may be between approximately 0 to 16, or other number of, available LTR slots. Similarly, the number of available LTR slots of a decoder may be between approximately 0 to 16, or other number of, available LTR slots. The number of available LTR slots to be utilized by the example LTR frame selection systems and methods described herein may be the lesser of the number of available LTR slots of the encoder and the number of available LTR slots of the decoder. Further, the transmission latency or round-trip time associated with image frame transmission and acknowledgement receipt may be approximately 100 ms (milliseconds), approximately 150 ms, approximately 200 ms, or other values.

In one illustrative example, the framerate of video data may be 60 fps, the number of available LTR slots (Number_of_LTRs) may be 5 slots, and the round-trip time (RTT) associated with frame transmission and acknowledgement receipt may be 166.6 ms.

In order to determine the round-trip time in terms of the number of frames (RTT_Frames), equation (1) may be used:

$$\text{RTT\_Frames} = RTT/(1000/\mathit{framerate}) \tag{1}$$

Using the example values of RTT=166.6 ms and framerate=60 fps, the value of RTT_Frames may be determined or calculated to be 10 frames. Since RTT indicates a time duration associated with frame transmission and acknowledgement receipt, RTT_Frames correspondingly indicates a number of frames that would be encoded and transmitted during the time duration associated with frame transmission and acknowledgement receipt.

Then, using the calculated value of RTT_Frames, the frequency or average gap for marking frames as LTR frames (LTR_Gap) may be determined using equation (2):

$$\text{LTR\_Gap} = \text{RTT\_Frames}/\text{Number\_of\_LTRs} \tag{2}$$

Using the calculated value of RTT_Frames=10 and the Number_of_LTRs=5, the value of LTR_Gap may be determined or calculated to be 2 frames. Based on the determination for this example, the frequency or average gap for marking frames as LTR frames is calculated to be 2 frames, such that an image frame of video data may be selected or marked as an LTR frame at a frequency of every 2 frames.

The determinations or calculations described herein may maximize utilization of the available LTR slots in order to try to minimize the frequency or average gap for marking frames as LTR frames, which is further dependent on the framerate of video data and the round-trip time associated with frame transmission and acknowledgement receipt.

In a different illustrative example, the framerate of video data may be 120 fps, the number of available LTR slots (Number_of_LTRs) may be 5 slots, and the round-trip time (RTT) associated with frame transmission and acknowledgement receipt may be 166.6 ms. Then, using equation (1) herein, the value of RTT_Frames may be determined or calculated to be 20 frames. In addition, using equation (2) herein, the value of LTR_Gap may be determined or calculated to be 4 frames. Based on this determination for this example, the frequency or average gap for marking frames as LTR frames is calculated to be 4 frames, such that an image frame of video data may be selected or marked as an LTR frame at a frequency of every 4 frames.

Various other examples having different values of framerate, number of available LTR slots, and/or round-trip time may be determined or calculated to have other values of frequency or average gap for marking frames as LTR frames. In further example embodiments, one or more minimum or maximum frequencies or average gaps may be determined or utilized as lower and upper bounds of the calculated frequency or average gap, e.g., a minimum frequency or average gap of 2 frames, 4 frames, or other number of frames, and/or a maximum frequency or average gap of 10 frames, 15 frames, 20 frames, or other number of frames.

Figure 3:
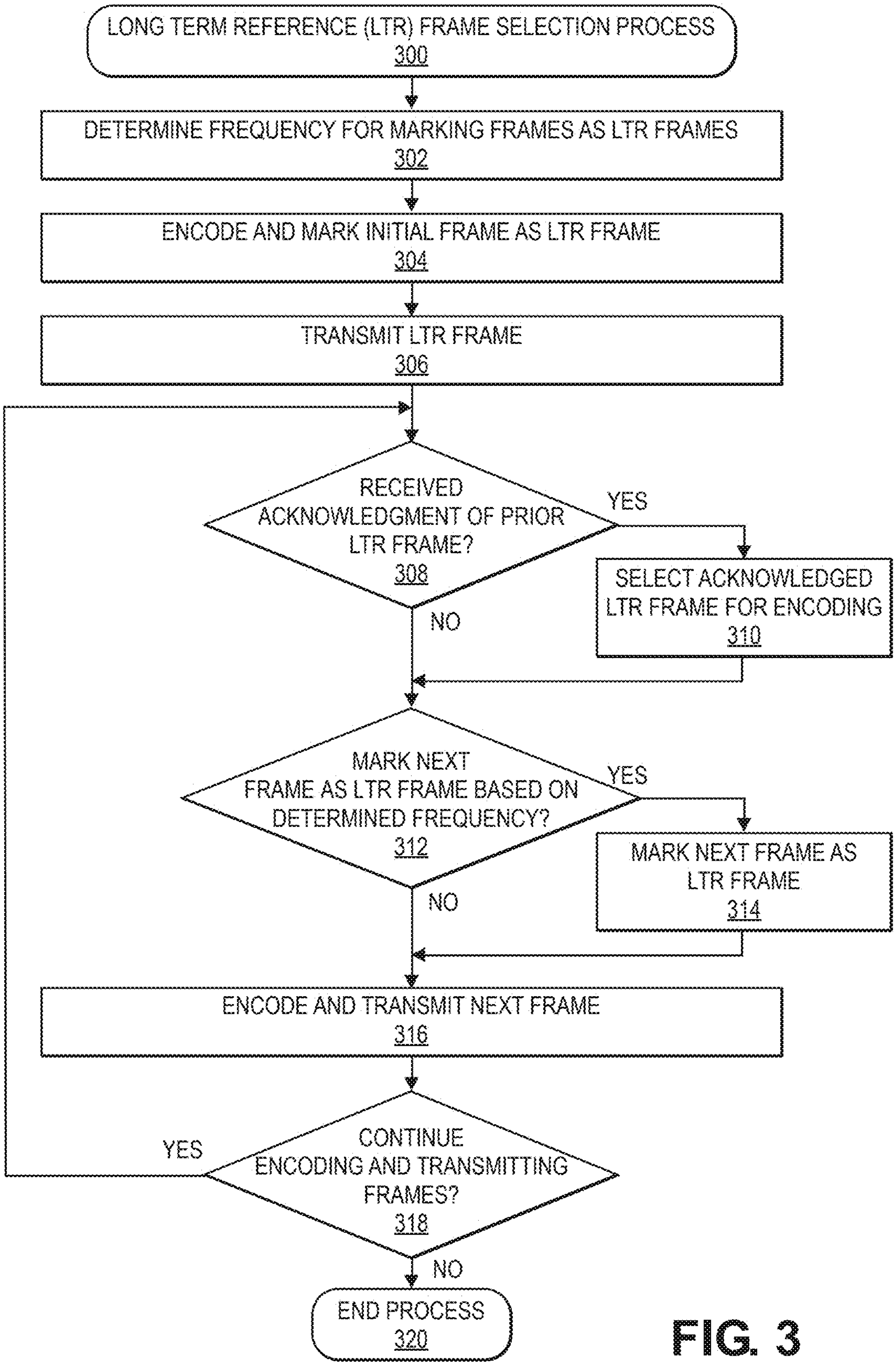
FIG. 3 is a flow diagram illustrating an example long term reference frame selection process, in accordance with implementations of the present disclosure.

FIG. 3 is a flow diagram illustrating an example long term reference frame selection process 300, in accordance with implementations of the present disclosure.

The process 300 may begin by determining a frequency for marking frames as LTR frames, as at 302. For example, a frequency or an average gap for marking frames as LTR frames may be selected, determined, or calculated. As described herein, the frequency or average gap may include a fixed interval, or the frequency or average gap may comprise a determination or calculation based on various factors, such as a framerate of video data, a number of available LTR slots, a round-trip time associated with frame transmission and acknowledgement receipt, and/or other factors. Additional details of the adaptive determination or calculation of the frequency or average gap for marking frames as LTR frames are described herein at least with respect to FIG. 4. Further, an encoder, or a processor associated with the encoder, may determine the frequency or average gap for marking frames as LTR frames.

The process 300 may continue by encoding and marking an initial frame as an LTR frame, as at 304. For example, a first or initial image frame of video data may be selected or marked as an LTR frame. In addition, the LTR frame may be encoded for transmission to a client device via a network. Further, the encoder, or a processor associated with the encoder, may encode and mark the initial image frame as an LTR frame.

The process 300 may proceed by transmitting the LTR frame, as at 306. For example, the LTR frame may be transmitted from the encoder via the network to a decoder of the client device. Various communication devices or methods may be used to transmit the LTR frame, and other frames, between the encoder and decoder via the network. Further, the encoder, or a processor associated with the encoder, may transmit the LTR frame.

The process 300 may continue to determine whether an acknowledgement of a prior LTR frame has been received, as at 308. For example, it may be determined whether an acknowledgement message or signal associated with a previously transmitted LTR frame has been received, by the encoder, from the decoder via the network. Further, the encoder, or a processor associated with the encoder, may determine whether an acknowledgement signal of a previously transmitted LTR frame has been received.

If an acknowledgement signal has been received, the process 300 may proceed to select the acknowledged LTR frame for encoding, as at 310. For example, additional image frames of the video data may be encoded using the acknowledged LTR frame as a reference. Further, the encoder, or a processor associated with the encoder, may select the acknowledged LTR frame for encoding of future image frames.

If, however, an acknowledgement signal has not been received at step 308, or after selecting the acknowledged LTR frame for encoding at step 310, the process 300 may continue with determining whether to mark a next frame as an LTR frame based on the determined frequency, as at 312. For example, it may be determined whether a number of frames corresponding to the determined or calculated frequency or average gap, e.g., as determined at step 302, have been encoded and transmitted, such that a next image frame of the video data is to be selected or marked as a next LTR frame. Further, the encoder, or a processor associated with the encoder, may determine whether to mark a next image frame as an LTR frame based on the determined frequency or average gap.

If a next image frame is to be marked as a next LTR frame, the process 300 may proceed with marking the next frame as an LTR frame, as at 314. For example, the next image frame of video data may be selected or marked as an LTR frame. Further, the encoder, or a processor associated with the encoder, may mark the next image frame as an LTR frame.

If, however, a next image frame is not to be marked as a next LTR frame at step 312, or after marking the next image frame as an LTR frame at step 314, the process 300 may continue by encoding and transmitting a next frame, as at 316. For example, the next image frame, which may comprise an additional image frame or a next LTR frame, may be encoded and transmitted by the encoder via the network to the decoder of the client device. Various communication devices or methods may be used to transmit the next image frame between the encoder and decoder via the network. Further, the encoder, or a processor associated with the encoder, may encode and transmit the next image frame.

The process 300 may then proceed by determining whether to continue encoding and transmitting frames, as at 318. For example, it may be determined whether encoding and transmission of image frames of the video data is to continue or stop. If encoding and transmission of image frames of the video data is to continue, the process 300 may return to step 308 to continue checking for received acknowledgement signals associated with prior LTR frames, marking additional image frames as LTR frames based on the determined frequency or average gap, and encoding and transmitting additional image frames, e.g., using a most recently acknowledged LTR frame as a reference.

If, however, encoding and transmission of image frames of the video data is to stop, the process 300 may then end, as at 320.

Figure 4:
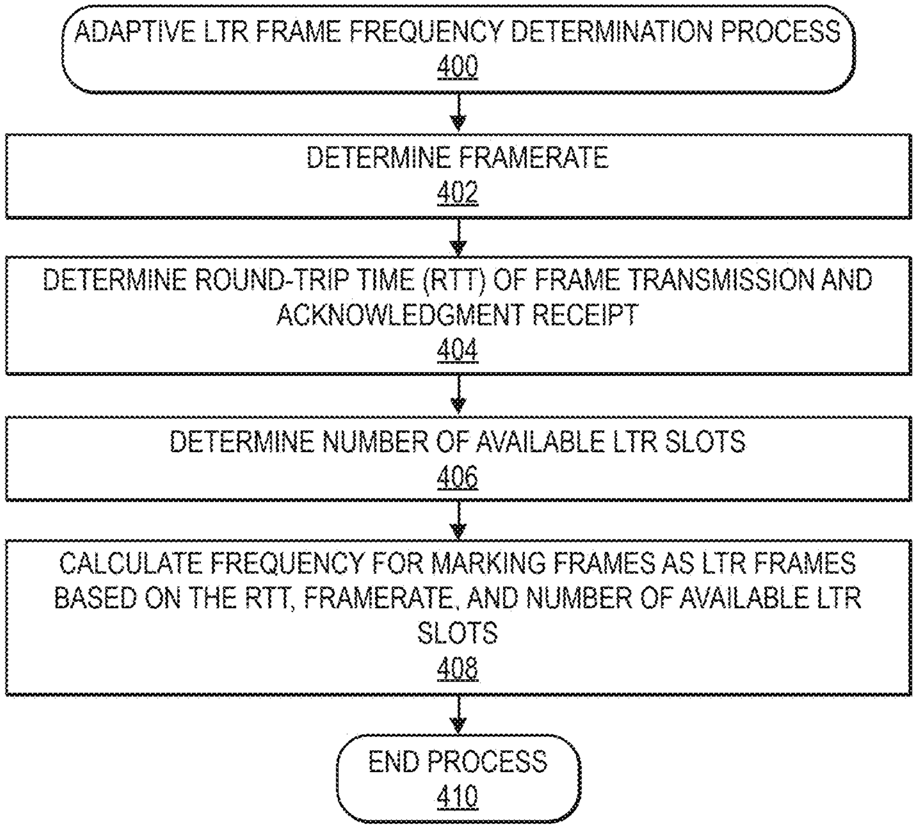
FIG. 4 is a flow diagram illustrating an example adaptive long term reference frame frequency determination process, in accordance with implementations of the present disclosure.

FIG. 4 is a flow diagram illustrating an example adaptive long term reference frame frequency determination process 400, in accordance with implementations of the present disclosure.

The process 400 may begin by determining a framerate of video data, as at 402. For example, the framerate of video data may be associated with streaming television, movies, or other media, streaming, online, or cloud video games or gaming services, other live-streaming media or games, and/or other types of streaming video data. In some examples, the framerate may comprise values such as approximately 60 fps (frames per second), 120 fps, or other values. Further, an encoder, or a processor associated with the encoder, may determine a framerate of streaming video data.

The process 400 may continue by determining a round-trip time (RTT) of frame transmission and acknowledgement receipt, as at 404. For example, the round-trip time may comprise a total network latency associated with transmitting an image frame from the encoder to the decoder via the network, and receiving an acknowledgement signal by the encoder from the decoder via the network. Generally, the RTT may be expressed or measured in terms of milliseconds, e.g., approximately 100 ms (milliseconds), approximately 150 ms, approximately 200 ms, or other values. In some examples, the RTT may be determined based on determination, calculation, or average of past transmissions of image frames and corresponding receipts of acknowledgement signals. In other examples, the RTT may be determined by transmitting pings or signals from the encoder to the decoder via the network, and receiving acknowledgement pings or signals by the encoder from the decoder via the network. Various other methods may be used to determine the RTT. Further, the encoder, or a processor associated with the encoder, may determine the RTT associated with image frame transmission and acknowledgement signal receipt.

The process 400 may proceed by determining a number of available LTR slots, as at 406. For example, the encoder of a video server may comprise a number of available LTR slots, and the decoder of a client device may also comprise a number of available LTR slots. Generally, a number of available LTR slots of either the encoder or decoder may be determined or set based on hardware specifications, configurations, or attributes. In some examples, the encoder and/or decoder may include approximately 0 to 16 available LTR slots. In addition, when determining or calculating a frequency or average gap for marking frames as LTR frames, the lesser of the number of available LTR slots of the encoder and the number of available LTR slots of the decoder may be selected or used as the number of available LTR slots, in order to maximize utilization of substantially all available LTR slots of each of the encoder and decoder. Various hardware specifications, configurations, or attributes of the decoder may be provided or transmitted to the encoder, e.g., together with a request for a video stream and/or as part of other communications, handshakes, or acknowledgments during initiation or playback of a video stream. Further, the encoder, or a processor associated with the encoder, may determine a number of available LTR slots.

The process 400 may then continue to calculate a frequency for marking frames as LTR frames based on the RTT, framerate, and number of available LTR slots, as at 408. For example, based on the framerate of video data, the RTT of image frame transmission and acknowledgement signal receipt, and the number of available LTR slots, a frequency or average gap for marking frames as LTR frames may be determined or calculated. As described herein, equations (1) and (2) may be used to calculate the frequency or average gap, by which LTR frames may be selected or marked for encoding and transmission of the video data. Further, the encoder, or a processor associated with the encoder, may calculate the frequency or average gap for marking frames as LTR frames.

The process 400 may then end, as at 410.

In additional example embodiments, the adaptive LTR frame frequency determination process described herein may be performed continuously, intermittently, periodically, or otherwise repeated over time. Thus, if any aspects or attributes of the frequency or average gap calculation change over time, e.g., framerate, RTT, or others, the calculation can be repeated in order to modify or change the frequency or average gap that is used during encoding and transmission of the video data. In this manner, the frequency or average gap may change, increase, or decrease adaptively over time to maintain or improve video quality.

Figure 5:
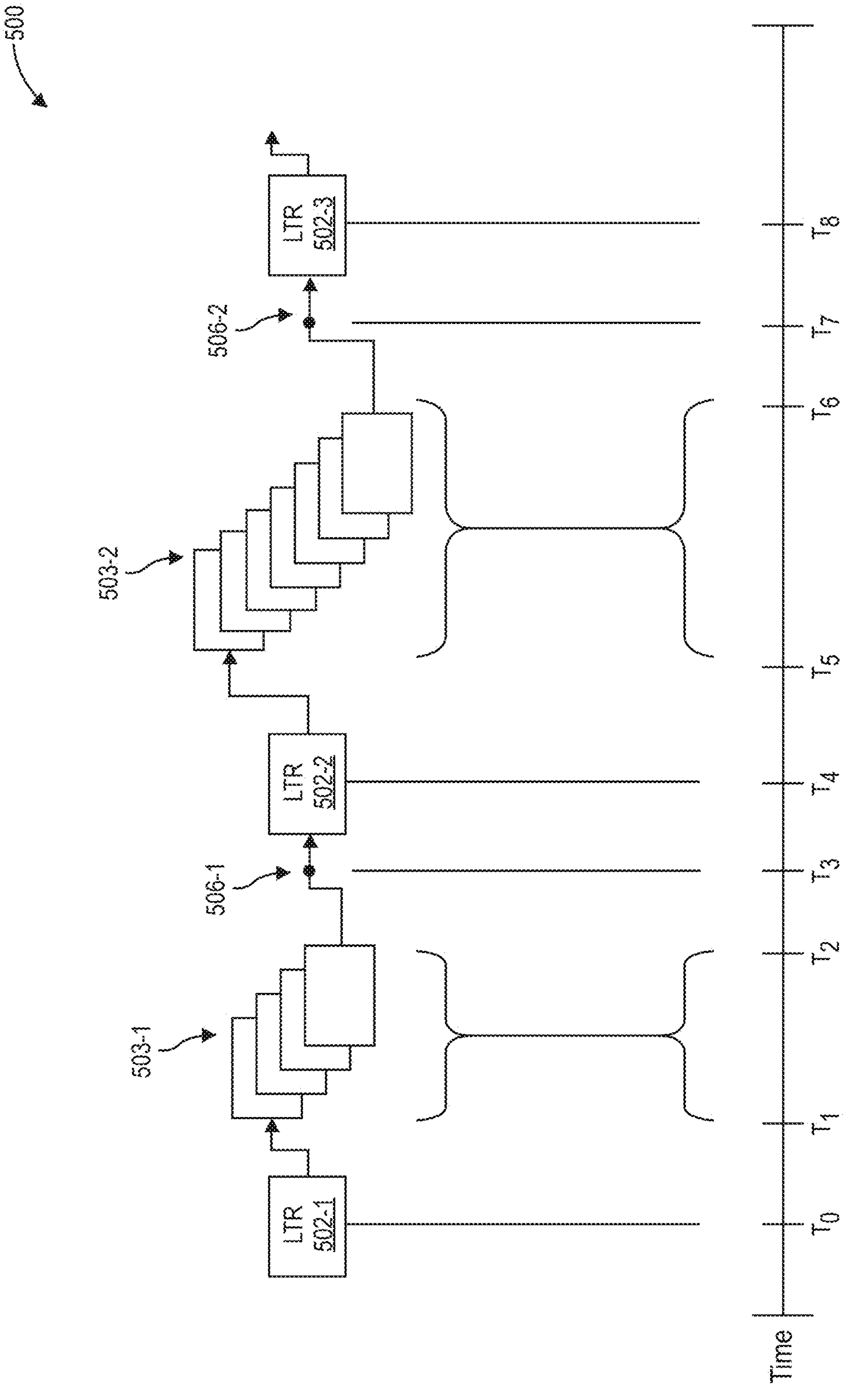
FIG. 5 is a schematic diagram of another example long term reference frame selection sequence, in accordance with implementations of the present disclosure.

FIG. 5 is a schematic diagram 500 of another example long term reference frame selection sequence, in accordance with implementations of the present disclosure.

As shown in the schematic timeline diagram of FIG. 5 for an example embodiment of a long term reference frame selection sequence, at time $T_0$, an encoder of a video server may select or mark an image frame of video data as a first LTR frame 502-1, and may also encode and transmit the first LTR frame 502-1 to a decoder of a client device via a network. Between times $T_1$ and $T_2$, the encoder may encode and transmit further image frames 503-1, e.g., one or more further image frames of video data after the first LTR frame 502-1.

While encoding the image frames 503-1 for transmission, one or more content or quality metrics may be determined or calculated for individual image frames. Various content or quality metrics may be used or calculated, which may provide outputs or calculated values that indicate an overall content or quality of individual image frames.

In one example, a quantization parameter (QP) metric may be calculated for individual image frames. For example, when encoding a particular image frame, an encoder may determine or calculate a QP metric associated with the particular image frame. Generally, the QP metric may comprise a calculation or computation based on differences in content between the particular image frame and a frame that is used as a reference for encoding. In this respect, a higher value of QP metric may indicate a greater difference in content between the particular image frame and an LTR frame, or other frame, that is used as a reference for encoding. As a result, the QP metric may indirectly indicate a difference in content between the particular image frame and an LTR frame, or other frame, that is used as a reference. Further, one or more thresholds may be associated with the QP metric or other content or quality metrics, in order to facilitate or trigger selection of a new LTR frame to maintain or improve video quality.

In some examples, the QP metric may comprise a value between approximately 0 and 52 that is a rough or approximate measure of quality of the encoded frame, in which a lower value indicates higher quality and a higher value indicates lower quality. In addition, an average value of QP metric associated with acceptable video quality for encoded image frames may be between approximately 7 to 10, or similar values. Further, an example threshold value of QP metric above which a next image frame may be selected as an LTR frame may be approximately 16, 20, 25, or similar values.

Continuing with the schematic timeline diagram of FIG. 5, at time $T_3$, based on a determination or calculation of a content or quality metric, e.g., a QP metric, the encoder of the video server may make a determination, at 506-1, that a most recently encoded frame among image frames 503-1 is above a threshold value that indicates low video quality and/or high content difference. Based on this determination related to video quality, at time $T_4$, the encoder of the video server may select or mark a next image frame of video data as a second LTR frame 502-2, and may also encode and transmit the second LTR frame 502-2 to the decoder of the client device via the network. Between times $T_5$ and $T_6$, the encoder may encode and transmit further image frames 503-2, e.g., one or more further image frames of video data after the second LTR frame 502-2.

Continuing further with the illustrated example, at time $T_7$, based on a determination or calculation of a content or quality metric, e.g., a QP metric, the encoder of the video server may make another determination, at 506-2, that a most recently encoded frame among image frames 503-2 is above a threshold value that indicates low video quality and/or high content difference. Based on this determination related to video quality, at time $T_8$, the encoder of the video server may select or mark a next image frame of video data as a third LTR frame 502-3, and may also encode and transmit the third LTR frame 502-3 to the decoder of the client device via the network.

The example sequence shown in FIG. 5 may substantially repeat over time, e.g., with subsequent determinations of content or quality metrics for encoded frames, as well as selection, encoding, and transmission over time of future selected LTR frames. For example, after time $T_8$, the encoder may continue to encode and transmit further image frames. At a later time after transmitting such further image frames, the encoder may make a further determination that a most recently encoded frame among the further image frames is above a threshold value that indicates low video quality and/or high content difference, and the encoder may then select or mark a next image frame of the video data as a further LTR frame.

By selecting LTR frames based on determinations related to content or quality of encoded frames, the example LTR frame selection sequence described herein may adaptively select or mark LTR frames responsive to indications of low video quality and/or high content difference, thereby maintaining or improving video quality.

Thus, the example long term reference frame selection sequence shown in the schematic timeline diagram of FIG. 5 may maintain or improve video quality, at least in part due to the adaptive selection, encoding, and transmission of LTR frames over time based on content or quality of encoded frames, that may be performed in the absence of and/or irrespective of receipt of an acknowledgement message or signal associated with previously transmitted LTR frames.

In additional example embodiments, various aspects of the example LTR frame selection sequences of FIGS. 2 and 5 may be combined in various ways. For example, although not described in detail with respect to FIG. 5, acknowledgement messages or signals associated with previously transmitted LTR frames may be received in the context of adaptive LTR frame selection based on content or quality, and such acknowledged LTR frames may be used as a reference for encoding additional image frames. Further, the adaptive selection of LTR frames based on content or quality described with respect to FIG. 5 may be combined with the selection of LTR frames according to or based on a fixed interval described with respect to FIG. 2.

Moreover, the adaptive selection of LTR frames based on content or quality described with respect to FIG. 5 may be combined with the adaptive selection of LTR frames based on various factors described with respect to FIG. 2. In some such combinations, LTR frames may be selected using frequency or average gap determinations based on framerate, RTT, number of available LTR slots, and/or other factors, and simultaneously or concurrently, LTR frames may also be selected responsive to determinations of content or quality metrics of encoded frames. Such combinations may maintain or improve video quality by maximizing utilization of available LTR slots through adaptive selection of LTR frames based on total network latency, while also selecting LTR frames responsive to content or quality metrics associated with encoded frames.

Figure 6:
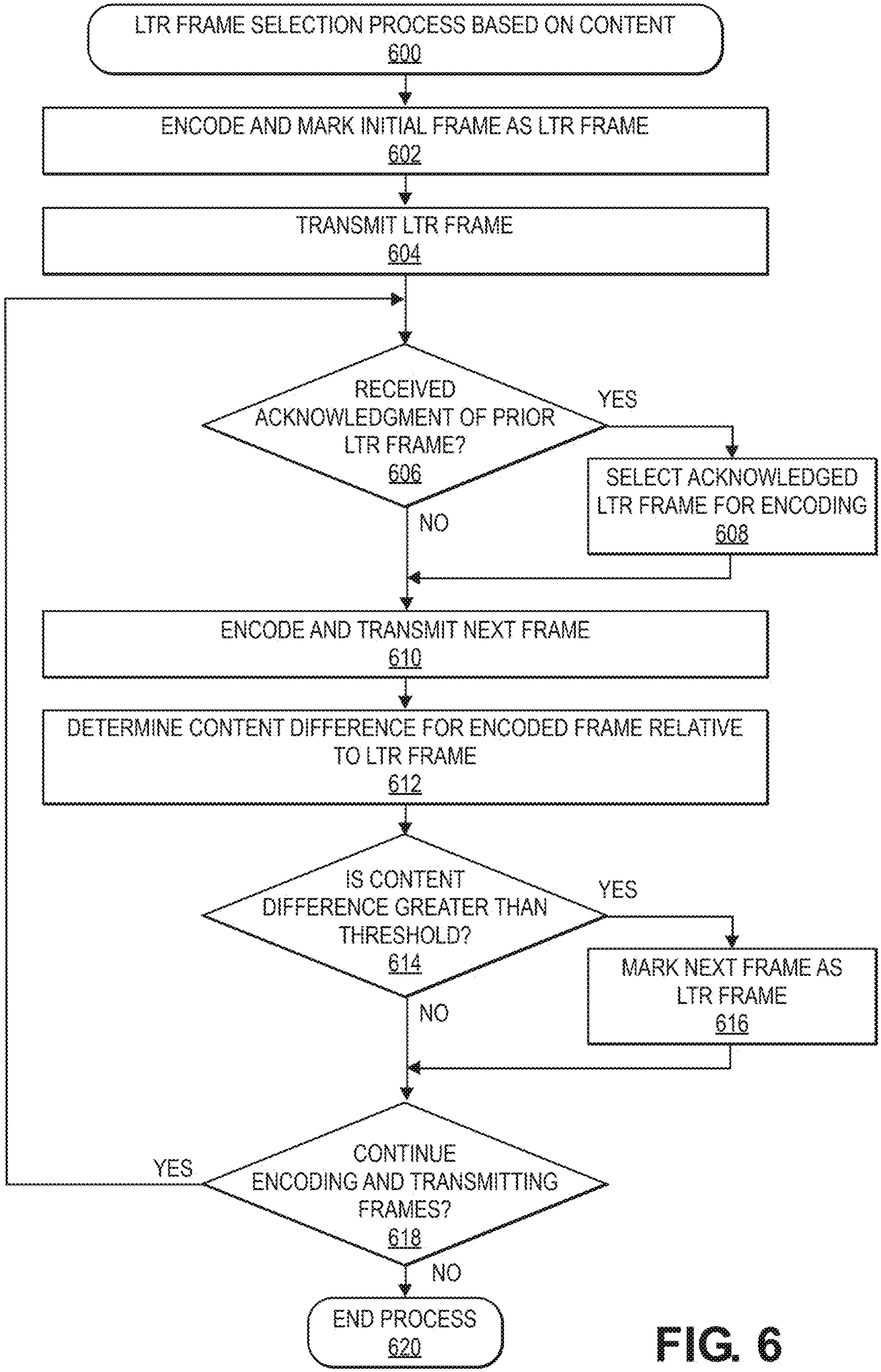
FIG. 6 is a flow diagram illustrating an example long term reference frame selection process based on content, in accordance with implementations of the present disclosure.

FIG. 6 is a flow diagram illustrating an example long term reference frame selection process based on content 600, in accordance with implementations of the present disclosure.

The process 600 may begin by encoding and marking an initial frame as an LTR frame, as at 602. For example, a first or initial image frame of video data may be selected or marked as an LTR frame. In addition, the LTR frame may be encoded for transmission to a client device via a network. Further, the encoder, or a processor associated with the encoder, may encode and mark the initial image frame as an LTR frame.

The process 600 may continue by transmitting the LTR frame, as at 604. For example, the LTR frame may be transmitted from the encoder via the network to a decoder of the client device. Various communication devices or methods may be used to transmit the LTR frame, and other frames, between the encoder and decoder via the network. Further, the encoder, or a processor associated with the encoder, may transmit the LTR frame.

The process 600 may proceed by determining whether an acknowledgement of a prior LTR frame has been received, as at 606. For example, it may be determined whether an acknowledgement message or signal associated with a previously transmitted LTR frame has been received, by the encoder, from the decoder via the network. Further, the encoder, or a processor associated with the encoder, may determine whether an acknowledgement signal of a previously transmitted LTR frame has been received.

If an acknowledgement signal has been received, the process 600 may continue to select the acknowledged LTR frame for encoding, as at 608. For example, additional image frames of the video data may be encoded using the acknowledged LTR frame as a reference. Further, the encoder, or a processor associated with the encoder, may select the acknowledged LTR frame for encoding of future image frames.

If, however, an acknowledgement signal has not been received at step 606, or after selecting the acknowledged LTR frame for encoding at step 608, the process 600 may proceed to encode and transmit a next frame, as at 610. For example, the next image frame, which may comprise an additional image frame or a next LTR frame, may be encoded and transmitted from the encoder via the network to the decoder of the client device. Various communication devices or methods may be used to transmit the next image frame between the encoder and decoder via the network. Further, the encoder, or a processor associated with the encoder, may encode and transmit the next image frame.

Then, the process 600 may continue with determining a content difference for the encoded frame relative to an LTR frame, as at 612. For example, a content or quality metric, e.g., a quantization parameter (QP) metric or other metrics, may be determined or calculated for the most recently encoded frame. As described herein, the content or quality metric may indicate a quality of the encoded frame, and/or a content difference between the encoded frame and a frame that is used as a reference during encoding. Further, the encoder, or a processor associated with the encoder, may determine the content or quality metric associated with the encoded frame.

The process 600 may proceed with determining whether the content difference is greater than a threshold, as at 614. For example, the determined content or quality metric may be compared with a threshold value associated with video quality or content difference. In some examples, a value of the content or quality metric that is greater than the threshold value may be indicative of low video quality of the encoded frame, and/or high content difference between the encoded frame and a frame used as a reference for encoding. Further, the encoder, or a processor associated with the encoder, may determine whether the content or quality metric is greater than a threshold value.

If the content difference is determined to be greater than the threshold value at step 614, the process 600 may continue by marking a next frame as an LTR frame, as at 616. For example, the next image frame of video data may be selected or marked as an LTR frame based on the content or quality metric. Further, the encoder, or a processor associated with the encoder, may mark the next image frame as an LTR frame.

If, however, the content difference is determined to not be greater than the threshold value at step 614, or after marking the next image frame as an LTR frame at step 616, the process 600 may proceed by determining whether to continue encoding and transmitting frames, as at 618. For example, it may be determined whether encoding and transmission of image frames of the video data is to continue or stop. If encoding and transmission of image frames of the video data is to continue, the process 600 may return to step 606 to continue checking for received acknowledgement signals associated with prior LTR frames, encoding and transmitting additional image frames, e.g., using a most recently acknowledged LTR frame as a reference, and determining content or quality metrics of encoded frames in order to select or mark next image frames as LTR frames based on the content or quality.

If, however, encoding and transmission of image frames of the video data is to stop, the process 600 may then end, as at 620.

As described herein, the various steps of the example LTR frame selection processes of FIGS. 3, 4, and 6 may be combined in various ways. For example, the adaptive selection of LTR frames based on content or quality described with respect to FIG. 6 may be combined with the adaptive selection of LTR frames based on various factors described with respect to FIGS. 3 and 4. In some such combinations, frames may be marked or selected as LTR frames using frequency or average gap determinations based on framerate, RTT, number of available LTR slots, and/or other factors, and simultaneously or concurrently, frames may be marked or selected as LTR frames responsive to determinations of content or quality metrics of encoded frames. Such combinations may maintain or improve video quality by maximizing utilization of available LTR slots through adaptive selection of LTR frames based on network latency, while also selecting LTR frames responsive to content or quality metrics associated with encoded frames.

Figure 7:
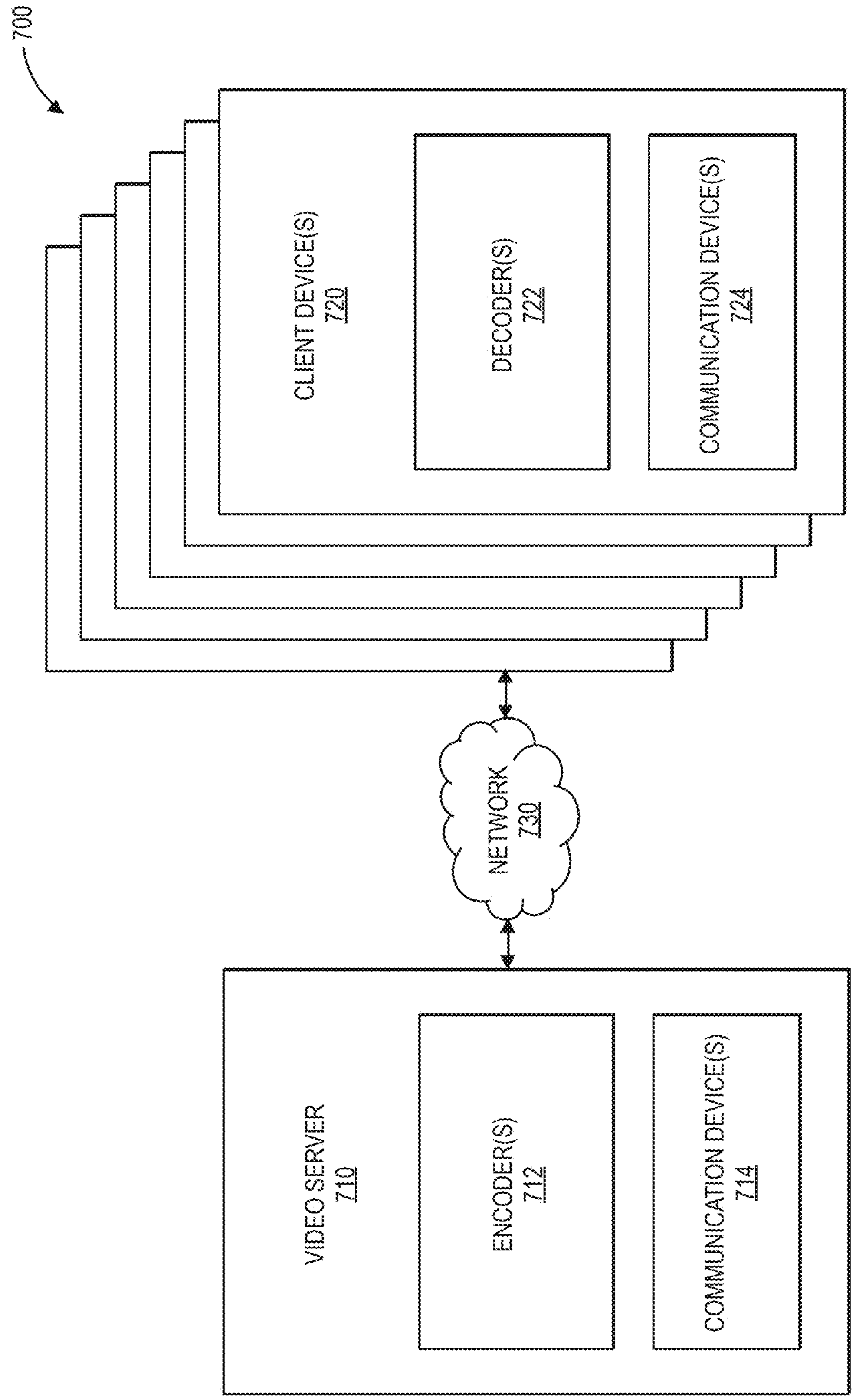
FIG. 7 is a block diagram illustrating various components of an example long term reference frame selection system of a video streaming service, in accordance with implementations of the present disclosure.

FIG. 7 is a block diagram illustrating various components of an example long term reference frame selection system 700 of a video streaming service, in accordance with implementations of the present disclosure.

As shown in the simplified block diagram of FIG. 7, an example LTR frame selection system for streaming video data may comprise a video server 710, one or more client devices 720, and a network 730. The video server 710 may comprise one or more processors, memories, encoders 712, communication devices 714, and/or other components configured to store, convert, compress, encode, process, transmit, and/or receive various data related to streaming video services. In addition, the client devices 720 may comprise one or more processors, memories, decoders 722, communication devices 724, and/or other components configured to store, convert, compress, decode, process, receive, and/or transmit various data related to streaming video services.

In example embodiments, the encoders 712 of the video server 710 may comprise various software, programs, applications, or other components to enable compression and transmission of video data using various video compression standards, protocols, or technologies. In addition, the communication devices 714 of the video server 710 may comprise various transmitters, receivers, transceivers, or other communication devices or network interfaces that can transmit and/or receive image frames, video data, acknowledgement messages or signals, or other data related to streaming video services.

Similarly, the decoders 722 of the client devices 720 may comprise various software, programs, applications, or other components to enable receipt and decompression of video data using various video compression standards, protocols, or technologies. In addition, the communication devices 724 of the client devices 720 may comprise various transmitters, receivers, transceivers, or other communication devices or network interfaces that can transmit and/or receive image frames, video data, acknowledgement messages or signals, or other data related to streaming video services.

Further, the encoders 712 of the video server 710 may comprise various software, programs, applications, or other components to enable adaptive determination of frequencies or average gaps for marking frames as LTR frames, as described herein. In addition, the encoders 712 may receive, determine, or calculate data related to various factors for the adaptive determination of frequencies or average gaps, including framerate of video data, round-trip time associated with image frame transmission and acknowledgement signal receipt, number of available LTR slots, and/or other factors. Moreover, the encoders 712 may comprise various software, programs, applications, or other components to enable determination of content or quality metrics, content differences, QP metrics, or other similar metrics for the adaptive selection of LTR frames based on content or quality.

The network 730 may be configured to allow data related to streaming video services to be exchanged between the video server 710 and one or more client devices 720 connected to the network 730, such as computers, laptops, phones, televisions, or other systems or devices configured to receive and present streaming video. In various implementations, the network 730 may comprise various wired or wireless general data networks, such as the Internet, any suitable type of Ethernet network, various types of local area networks, cellular communication networks, satellite communication networks, or others.

Those skilled in the art will appreciate that the example long term reference frame selection system 700 is merely illustrative and is not intended to limit the scope of implementations. In particular, the system and devices may include any combination of hardware or software that can perform the indicated functions, including other systems or controllers, computers, televisions, media presentation devices, network devices, internet appliances, etc. The example long term reference frame selection system 700 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3, 4, and 6, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method, comprising:

determining, by an encoder of a video server, a frequency for marking frames of a video stream as long term reference (LTR) frames based at least in part on a network latency between the encoder and a decoder of a client device and an available number of LTR slots associated with the decoder, the video stream comprising a first set of frames;

selecting, by the encoder from the first set of frames, a second set of frames to mark as the LTR frames at the frequency, wherein selecting the second set of frames comprises:

determining, by the encoder, a content difference between an encoded frame and an acknowledged LTR frame;

determining, by the encoder, that the content difference is greater than a threshold value; and selecting, by the encoder, a next frame of the first set of frames to mark as a next LTR frame based on the content difference;

encoding, by the encoder, the first set of frames including the second set of frames; and transmitting, by the encoder via a first communication device, the first set of frames including the second set of frames to the decoder via a network interface.

2. The method of claim 1, further comprising:

determining, by the encoder, a second frequency for marking frames of the video stream as LTR frames based at least in part on a change to the network latency; and selecting, by the encoder, the second set of frames to mark as the LTR frames at the second frequency.

3. The method of claim 1, wherein the network latency comprises a round trip time (RTT) associated with transmitting an LTR frame from the encoder to the decoder via the network interface, and receiving an acknowledgement of the LTR frame from the decoder by the encoder via the network interface.

4. The method of claim 1, wherein the available number of LTR slots associated with the decoder comprises a first number of LTR slots that is less than a second number of LTR slots associated with the encoder.

5. The method of claim 1, further comprising:

determining, by the encoder, a quality metric associated with a frame of the first set of frames;

determining, by the encoder, that the quality metric is greater than a threshold quality value; and selecting, by the encoder, a subsequent frame of the first set of frames to mark as an LTR frame based on the quality metric.

6. A method, comprising:

determining, by an encoder of a video server, a frequency for marking frames of a video stream as long term reference (LTR) frames based at least in part on a network latency between the encoder and a decoder of a client device, the video stream comprising a first set of frames;

selecting, by the encoder from the first set of frames, a second set of frames to mark as the LTR frames at the frequency, wherein selecting the second set of frames comprises:

determining, by the encoder, a content difference between an encoded frame and an acknowledged LTR frame;

determining, by the encoder, that the content difference is greater than a threshold value; and selecting, by the encoder, a next frame of the first set of frames to mark as a next LTR frame based on the content difference; and encoding and transmitting, by the encoder, the first set of frames including the second set of frames to the decoder via a network interface.

7. The method of claim 6, wherein the network latency comprises a round trip time (RTT) associated with transmitting, by the encoder, an LTR frame to the decoder via the network interface, and receiving, by the encoder, an acknowledgement of the LTR frame from the decoder via the network interface.

8. The method of claim 6, wherein the frequency is further determined based at least in part on an available number of LTR slots.

9. The method of claim 8, wherein the encoder includes a first number of LTR slots, and the decoder includes a second number of LTR slots; and wherein the available number of LTR slots comprises a lesser of the first number of LTR slots and the second number of LTR slots.

10. The method of claim 6, wherein the frequency is further determined based on a framerate of the video stream.

11. The method of claim 6, wherein selecting the second set of frames to mark as the LTR frames further comprises:

selecting an initial frame to mark as a first LTR frame;

wherein the first LTR frame is encoded and transmitted to the decoder.

12. The method of claim 11, wherein selecting the second set of frames to mark as the LTR frames further comprises:

selecting a subsequent frame to mark as a second LTR frame after the first LTR frame according to the frequency;

wherein the second LTR frame is encoded and transmitted to the decoder after the first LTR frame.

13. The method of claim 12, wherein the second LTR frame is encoded and transmitted to the decoder irrespective of receiving, by the encoder, an acknowledgement of the first LTR frame from the decoder.

14. The method of claim 6, wherein the content difference comprises a quantization parameter that is associated with a video quality of the encoded frame.

15. The method of claim 6, wherein selecting the second set of frames to mark as the LTR frames further comprises:

selecting a first frame to mark as a first LTR frame;

encoding and transmitting the first LTR frame to the decoder;

selecting a second frame to mark as a second LTR frame after the first LTR frame according to the frequency; and encoding and transmitting the second LTR frame to the decoder after the first LTR frame.

16. The method of claim 15, wherein the second LTR frame is encoded and transmitted to the decoder irrespective of receiving an acknowledgement of the first LTR frame from the decoder.

17. The method of claim 6, wherein the frequency is determined based at least in part on at least one of an available number of LTR slots, or a framerate of the video data.

* * * * *